United States Patent [19]
Byrnes

[11] 4,068,279
[45] Jan. 10, 1978

[54] POWER MONITOR

[76] Inventor: Gerald J. Byrnes, 1545 Overton Park Ave., Memphis, Tenn. 38112

[21] Appl. No.: 736,720

[22] Filed: Oct. 28, 1976

[51] Int. Cl.² ............................................. H02H 3/20
[52] U.S. Cl. ........................................ 361/56; 361/91; 361/111
[58] Field of Search ....................... 361/15, 16, 17, 54, 361/55, 56, 91, 111

[56] References Cited

U.S. PATENT DOCUMENTS

| | | | |
|---|---|---|---|
| 3,518,489 | 6/1970 | Musham | 361/56 |
| 3,546,572 | 12/1970 | Specht et al. | 361/56 X |
| 4,023,071 | 5/1977 | Fussell | 361/56 |

FOREIGN PATENT DOCUMENTS 2,259,530  6/1973  Germany ......................... 361/56

Primary Examiner—Harry E. Moose, Jr.
Attorney, Agent, or Firm—Clarence A. O'Brien; Harvey B. Jacobson

[57] ABSTRACT

Electrical power lines connected to loads are monitored by a protective circuit assembly to suppress peak transient voltages and surges by use of a Zener clamping device. Impedance branches connected in parallel with the Zener device share the transient loads when Zener break-down occurs under abnormal conditions. Each impedance branch includes a non-linear resistor arranged to clip voltages at different levels, at least one of the branches having a fixed resistor connected in series with the non-linear resistor.

8 Claims, 4 Drawing Figures

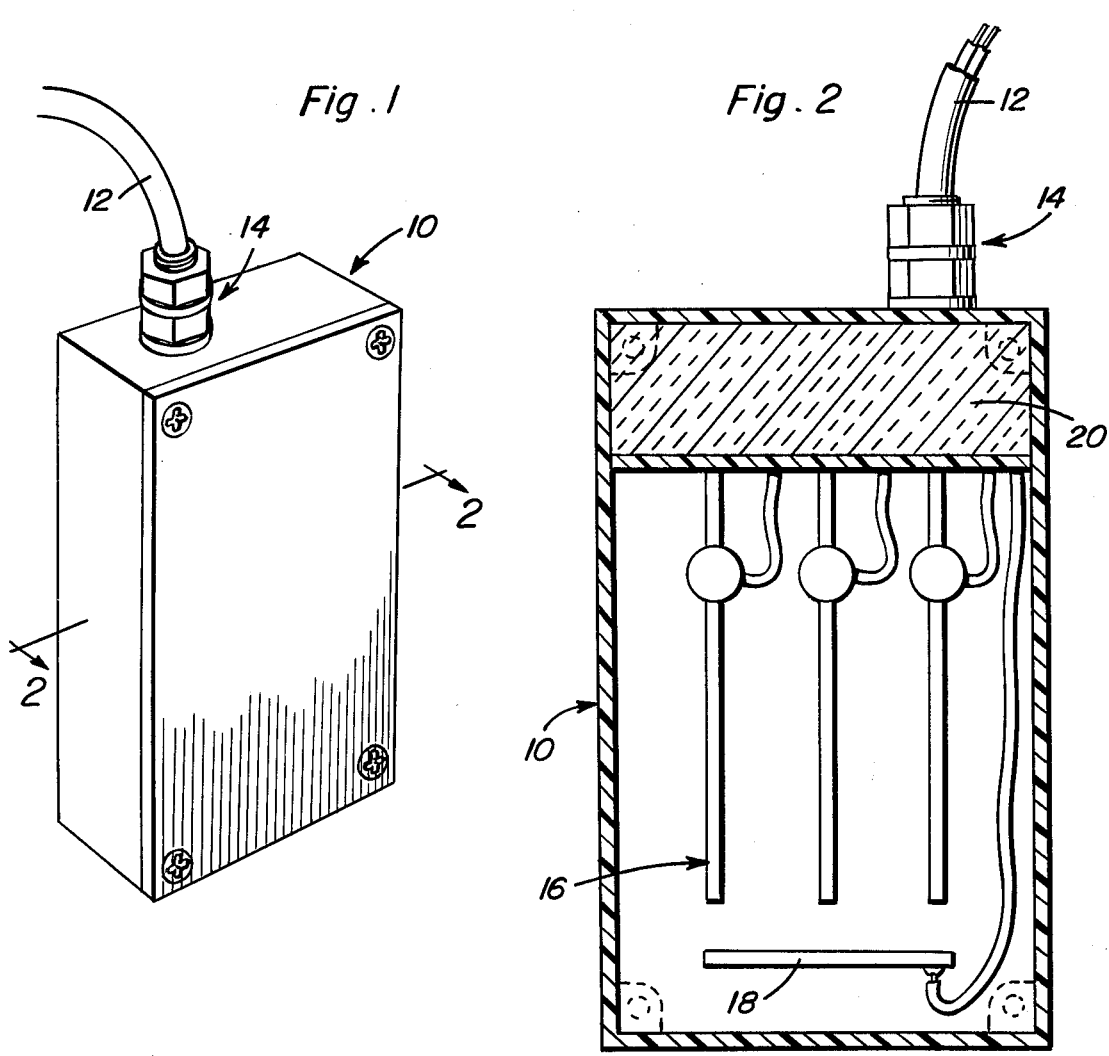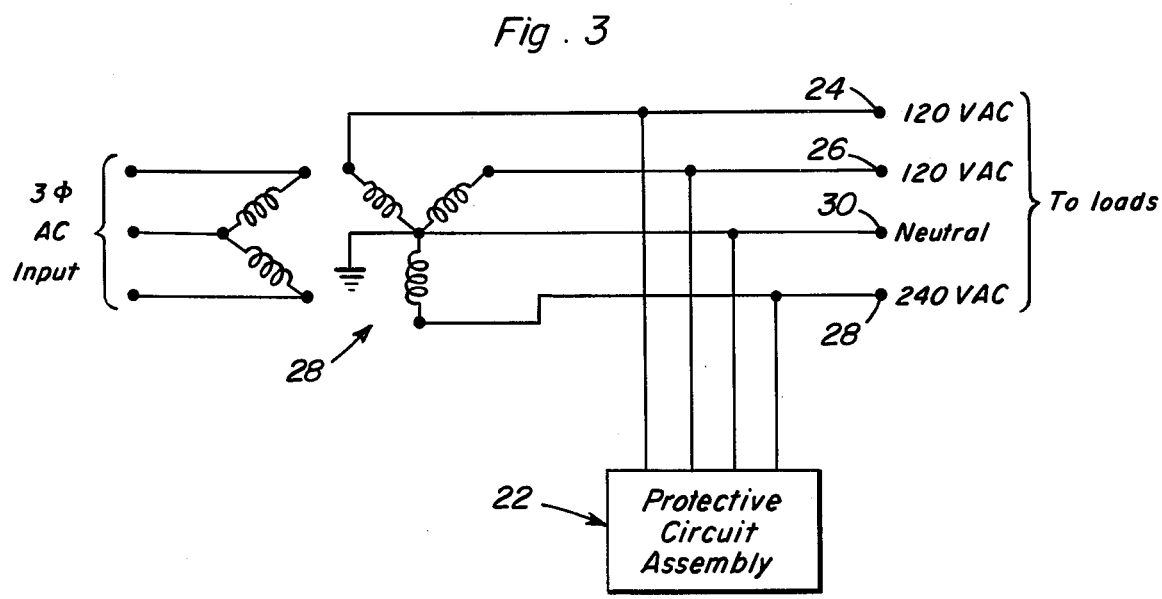

POWER MONITOR

BACKGROUND OF THE INVENTION

This invention relates to protective circuits for electrical power lines whereby damage to electrical loads from transient and surge voltages is prevented.

Many protective circuits have been devised for electrical power lines designed to detect and suppress transient voltages and/or surges of the power source that may cause damage to electrical equipment to which the power lines are connected. Certain types of such protective circuits utilize a Zener diode device that is rendered conductive when a predetermined breakdown voltage applied thereacross is exceeded. Such Zener devices are thereby operative to clip excessively high peak voltages that may occur. Problems arise, however, in providing Zener diodes capable of handling transient loads over an extended period of time because of heat developed. Various capacitive filters and nonlinear resistors have been utilized for such protective circuits in order to deal with other problems such as rapid response time and preventing unintended breakdown of the Zener diode.

It is therefore an important objective of the present invention to provide a protective circuit assembly which is operative to monitor power lines and suppress short term transient currents by use of Zener diodes in a more efficient and reliable manner.

SUMMARY OF THE INVENTION

In accordance with the present invention, a protective circuit assembly is connected to one or more power lines from an AC power source to establish shunt paths to a neutral line in order to protect electrical loads against damage from high transient peak voltages. The protective circuit assembly includes a circuit section for each power line operative to monitor a sinusoidal waveform voltage therein and suppress any transient peak voltages that may occur because of defects in the power source or the electrical loads. Each circuit section includes at least three parallel connected branches which share the transient loads so as to more effectively dissipate heat and more efficiently suppress transient peak voltages including short term transients by establishment of current shunt paths to the neutral line. A Zener diode device forms one of the branches and has a voltage breakdown value substantially equal to the normal peak voltage of the sinusoidal waveform in the power line to which it is connected. Non-linear impedance devices such as varistors are connected in the other branches having voltage ratings that are respectively above and below the breakdown voltage value of the Zener device. The lower voltage rated varistor is connected in series with a fixed resistor so that a clipping level may be established through its circuit branch which is lower than that of the higher voltage rated varistor yet higher than the voltage breakdown value of the Zener device. The fixed resistor is arranged to maintain relatively high resistances for the varistors under normal conditions by establishing voltage drops less than the breakdown value of the Zener device. A minimal amount of energy is accordingly utilized to maintain the protective circuits in a standby condition under normal conditions and in an efficient operating mode under abnormal transient conditions.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view showing a power distribution box with which the protective circuit assembly of the present invention is associated;

FIG. 2 is a sectional view taken substantially through a plane indicated by section line 2—2 in FIG. 1;

FIG. 3 is a circuit diagram of a power supply showing a typical installation for the protective circuit assembly of the present invention.

DETAILED DESCRIPTION OF THE PREFERRED EMBODIMENT

Figure 4:
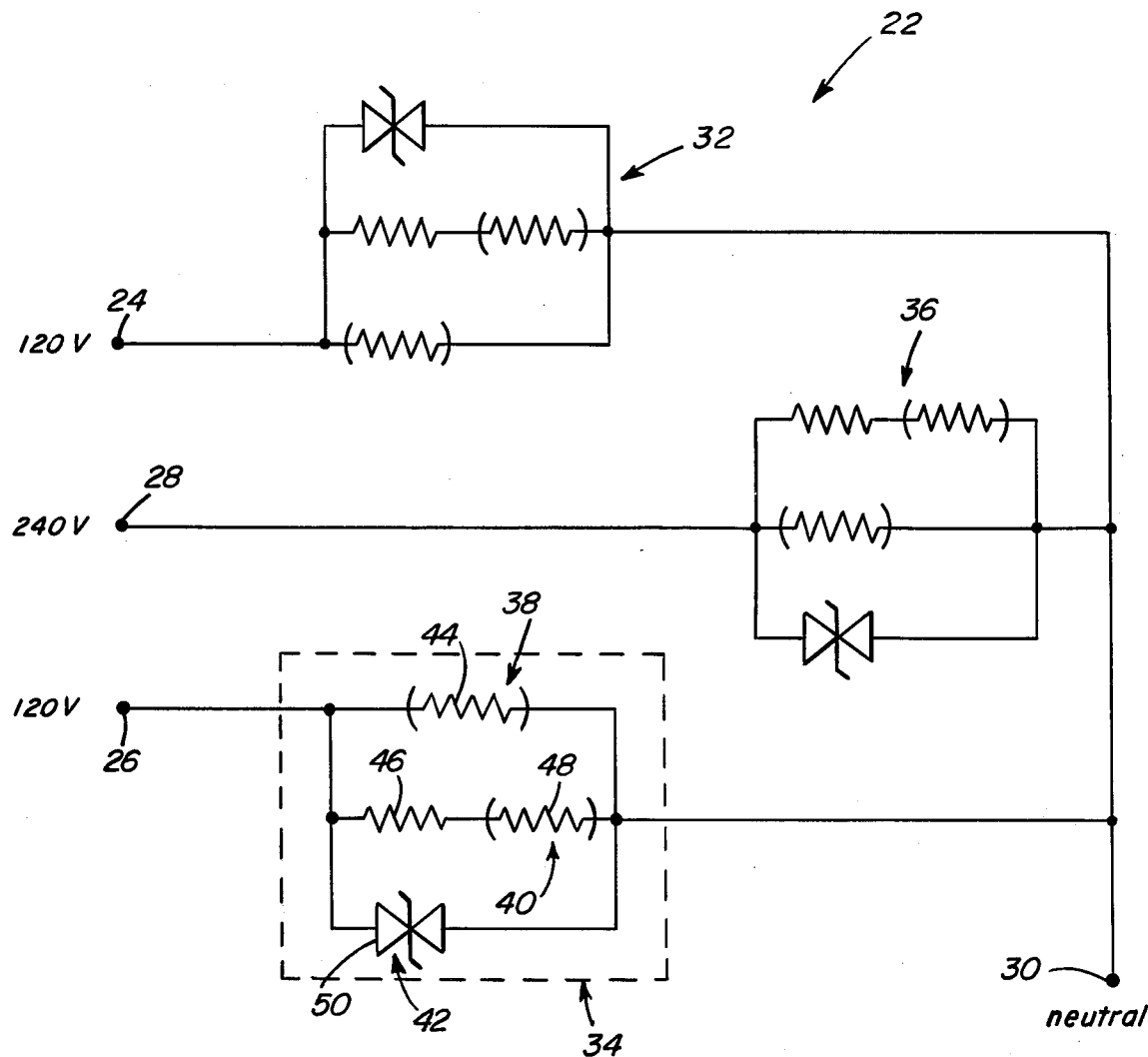
FIG. 4 is a circuit diagram of the protective circuit assembly itself.

Referring now to the drawings in detail, FIG. 1 illustrates a typical power distribution box generally referred to by reference numeral 10 with which the present invention is associated. A power cable generally referred to by reference numeral 12 extends into the box through a fitting 14. As shown in FIG. 2, the power distribution box encloses three power phase legs 16 and a neutral bar 18 which may form part of a three phase AC power supply to which the protective circuit assembly of the present invention is connected. The protective circuit assembly is encapsulated within the distribution box by insulating material 20 and connected to the power supply through conductors extending from the power phase legs 16 and neutral bar 18.

In one installational embodiment as depicted in FIG. 2, the protective circuit assembly generally referred to by reference numeral 22 is connected to two 120-volt power phase terminals 24 and 26 of the power supply generally referred to by reference numeral 28 with which a higher, 240-volt power phase terminal 28 is also associated. Also, a neutral terminal 30 of the power supply is connected to the protective circuit assembly in parallel relation to electrical loads to which the power terminals may be connected. The protective circuit assembly is operative to monitor and suppress transient and/or surge voltages that occur because of various abnormal conditions by shunting to a neutral line at terminal 30 to protect the electrical loads that may otherwise be damaged.

As shown in FIG. 4, the protective circuit assembly includes three circuit sections 32, 34 and 36 which are similar in arrangement to each other and are respectively connected between the neutral terminal 30 and one of the power phase terminals 24, 26 and 28. Each circuit section includes three circuit branches 38, 40 and 42 connected in parallel. Circuit branch 38 consists of a varistor 44 having a voltage rating adapted to accommodate the full phase voltage applied at the power terminal to which the circuit section is connected. The circuit branch 40 consists of a fixed resistor 46 connected in series with a varistor 48 having a lower voltage rating than the varistor 44. The varistors 44 and 48 are non-linear resistors of a metal oxide type having a current characteristic which follows the equation $I = \lambda K E^n$, where I is the instantaneous current in the circuit branch, E is the instantaneous voltage across the varistor, and K and n are constants dependent on the material, geometry and processing of the varistor. The circuit branches 38 and 40 share transient loads with a third circuit branch 42 which consists of a voltage clamping device 50 such as back-to-back connected selenium diodes processed to obtain Zener type characteristics to clip transient peak voltages at a predetermined level. The voltage rating of the varistor 44 is slightly higher than that of the Zener device 50 while the voltage rating of varistor 48 is lower than that of Zener device 50.

The resistance of the fixed resistor 46 and the parameters of the varistors 44 and 48 are chosen so as to develop volt drops across circuit branch 38 and 40 under normal peak supply voltage conditions, slightly less than the breakdown voltage of the Zener device 50. The resistances of both varistors at that time, will be high so that power dissipation is small.

When the peak supply voltage is higher than normal because of transients and surges, breakdown of the Zener device 50 occurs in both directions to clip or suppress peak voltages since the voltage drops developed in the other branches 38 and 40 are then higher than the breakdown voltage of the Zener device. When breakdown of the Zener device 50 occurs, the transient load carried by the circuit branch 42 is shared with the other branches since the resistances of the varistors then drop sharply to provide shunt paths at different peak voltage clipping levels. For example, in a 120-volt protective circuit section 32 or 34, the varistors 44 and 48 are respectively rated at 95 volts and 130 volts as compared to 120 volts for the Zener device 50 to respectively establish peak clipping levels at 134 volts and 184 volts. A 50 volt clipping advantage is thereby provided as compared to clipping at the 120-volt peaks by Zener device 50 alone. This reduction in clipping voltage for each input power phase is effective to dissipate more heat and reduce resistances for more efficient monitoring and transient peak voltage suppression of the sinusoidal waveform power. The resistance of the fixed resistor 46 in each circuit section 32 and 34 will be two ohms to establish the 134 volt clipping level despite use of varistor 48 having the lower voltage rating of 95 volts. For the higher voltage phase line of 240 volts at power terminal 28, the circuit section 36 will have a five ohm fixed resister 46 connected in series with a 150 volt varistor 48 in branch 40. Branches 38 and 42 will respectively have a 250-volt varistor 44 and a 240-volt Zener device 50 therein.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention.

What is claimed as new is as follows:

1. A current shunting protection circuit connected to a source of line voltage including a plurality of parallel connected branches, voltage clamping means in a first of said branches for conducting current therethrough in response to line voltage exceeding a predetermined voltage breakdown value, non-linear impedance devices respectively connected in each of the other of the branches for establishing shunt paths therein under transient voltage conditions to clip peak voltages at different levels, and fixed impedance means connected in series with at least one of said non-linear impedance devices in a second of the branches for developing a volt drop across said second of the branches under normal peak voltage conditions that is less than said voltage breakdown value of the clamping means to prevent conduction of current therethrough, said non-linear impedance devices having impedances which decrease sharply when the line voltage exceeds said predetermined voltage breakdown value to share transient loads amongst said branches under transient voltage conditions.

2. The combination of claim 1, wherein another of said non-linear impedance devices establishes a clipping level above that of the voltage clamping means, said one of the non-linear impedance devices in series with the fixed impedance means establishing a clipping level for the second of the branches which is above that of the voltage clamping means but less than the clipping level of said other of the non-linear impedance devices.

3. The combination of claim 2, wherein said voltage clamping means is a Zener device and said non-linear impedance devices are varistors having voltage ratings above and below the voltage breakdown value of the Zener device.

4. The combination of claim 3, wherein said line voltage has a sinusoidal waveform with a normal peak voltage value approximately equal to the breakdown voltage value of the voltage clamping means.

5. The combination of claim 1, wherein said voltage clamping means is a Zener device and said non-linear impedance devices are varistors having voltage ratings above and below the voltage breakdown value of the Zener device.

6. The combination of claim 5, wherein said line voltage has a sinusoidal waveform with a normal peak voltage value approximately equal to the voltage breakdown value of the voltage clamping means.

7. The combination of claim 1, wherein said line voltage has a sinusoidal waveform with a normal peak voltage value approximately equal to the voltage breakdown value of the voltage clamping means.

8. The combination of claim 7, wherein another of said non-linear impedance devices establishes a clipping level above that of the voltage clamping means, said one of the non-linear impedance devices in series with the fixed impedance means establishing a clipping level for the second of the branches which is above that of the voltage clamping means but less than the clipping level of said other of the non-linear impedance devices.

* * * * *